United States Patent
Vachhani et al.

(10) Patent No.: US 8,538,415 B2
(45) Date of Patent: Sep. 17, 2013

(54) TRIGGER OF INTER-FREQUENCY MEASURMENTS WITHIN MOBILE RADIO COMMUNICATIONS DEVICE

(75) Inventors: Ajay Vachhani, Berkshire (GB); Michael Roberts, Berkshire (GB)

(73) Assignee: NEC Corporation, Tokyo (JP)

( * ) Notice: Subject to any disclaimer, the term of this patent is extended or adjusted under 35 U.S.C. 154(b) by 665 days.

(21) Appl. No.: 12/309,638

(22) PCT Filed: Jul. 20, 2007

(86) PCT No.: PCT/JP2007/064716
§ 371 (c)(1),
(2), (4) Date: Apr. 28, 2009

(87) PCT Pub. No.: WO2008/013246
PCT Pub. Date: Jan. 31, 2008

(65) Prior Publication Data
US 2009/0291687 A1    Nov. 26, 2009

(30) Foreign Application Priority Data

Jul. 28, 2006 (GB) .................................. 0615033.8

(51) Int. Cl.
*H04W 28/08* (2009.01)
*H04W 36/22* (2009.01)

(52) U.S. Cl.
USPC ............................ 455/423; 455/436; 455/453

(58) Field of Classification Search
USPC ................. 370/329–338, 342; 455/434–435, 455/453, 458, 522
See application file for complete search history.

(56) References Cited

U.S. PATENT DOCUMENTS

| | | | |
|---|---|---|---|
| 6,252,861 B1* | 6/2001 | Bernstein et al. | 370/331 |
| 6,567,670 B1* | 5/2003 | Petersson | 455/522 |
| 6,628,946 B1* | 9/2003 | Wiberg et al. | 455/434 |
| 6,697,622 B1 | 2/2004 | Ishikawa et al. | |
| 7,437,152 B2 | 10/2008 | Ishikawa et al. | |
| 7,778,641 B1* | 8/2010 | Willars et al. | 455/436 |
| 2002/0160777 A1* | 10/2002 | Takao et al. | 455/436 |
| 2003/0224730 A1* | 12/2003 | Muszynski et al. | 455/62 |
| 2004/0053630 A1* | 3/2004 | Ramos et al. | 455/500 |
| 2004/0071119 A1 | 4/2004 | Ishikawa et al. | |
| 2005/0164719 A1* | 7/2005 | Waters | 455/458 |
| 2006/0014544 A1* | 1/2006 | Tolli | 455/453 |

(Continued)

FOREIGN PATENT DOCUMENTS

| | | |
|---|---|---|
| JP | 2001-86545 A | 3/2001 |
| JP | 2001-251658 | 9/2001 |

(Continued)

OTHER PUBLICATIONS

Japanese Office Action dated Oct. 26, 2011 with partial English translation thereof.

*Primary Examiner* — Kashif Siddiqui
(74) *Attorney, Agent, or Firm* — McGinn IP Group, PLLC

(57) ABSTRACT

The invention provides for a method of initiating inter-frequency measurements within a mobile radio communications device and including the step of inspecting by way of a network the load state of the cell in which the mobile radio communications device is located, and further including the step of paging the mobile radio communications device with a Paging Type 1 message indicating that the mobile radio communications device can perform inter-frequency measurement on the cells identified within SIB before responding to the paging signal.

17 Claims, 1 Drawing Sheet

(56) References Cited

U.S. PATENT DOCUMENTS

| | | | |
|---|---|---|---|
| 2006/0084390 A1* | 4/2006 | Salonaho et al. | 455/67.11 |
| 2006/0252377 A1* | 11/2006 | Jeong et al. | 455/67.13 |
| 2007/0105580 A1* | 5/2007 | Farnsworth et al. | 455/522 |
| 2008/0125126 A1* | 5/2008 | Fang et al. | 455/436 |
| 2008/0253323 A1* | 10/2008 | Fischer | 370/329 |

FOREIGN PATENT DOCUMENTS

| | | |
|---|---|---|
| JP | 2002-541747 | 12/2002 |
| JP | 2004-159358 | 6/2004 |
| JP | 2006-165891 | 6/2006 |

\* cited by examiner

TRIGGER OF INTER-FREQUENCY MEASURMENTS WITHIN MOBILE RADIO COMMUNICATIONS DEVICE

TECHNICAL FIELD

The present invention relates to the initiation of inter-frequency measurements as provided within a mobile radio communications device such as a cell phone handset and, in particular, to a method for providing such an initiation, a related network arrangement and to a mobile radio communications device per se.

BACKGROUND ART

In view of the wide variations that can occur in network usage, and in particular in cells covering a geographical location providing a facility such as a sports stadium which can cause the total number of mobile phone users to vary widely, it can prove important to move network-traffic between cells and frequencies.

Therefore during busy hours such as those that might be experienced within the cell during a sporting event, it is conceivable that the network will become overloaded and will therefore be required to push traffic into a cell offering a less-loaded frequency layer.

Prior to performing such a handover to the desired cell, it is necessary for the network to initiate inter-frequency measurements within the mobile radio communications device handset so as to identify the most appropriate target cell and frequency.

The provision of such inter-frequency measurements that are then provided in return from the mobile radio communications device handset to the network, assists the Radio Resources Management (RRM) layer within the network to balance the signalling load across the available frequencies.

Without such inter-frequency measurements, the network would not be able to use its resources efficiently and, likewise, the mobile radio communications device would be more likely to suffer from interference insofar as it could not be assigned to a new frequency. Yet further, if greater interference is experienced by a device handset that handset is then likely to initiate transmission at a higher power which would lead to joint disadvantages of greater power consumption, and thus shorter battery life, and the likely generation of greater interference for other users.

It should however be appreciated that the performance of inter-frequency measurements consumes battery power, and so the trigger of inter-frequency measurements should be carefully controlled.

Indeed, in order to save power while the mobile radio communications device is in the IDLE/CELL PCH and URA-PCH states, the device generally does not perform inter-frequency measurements such that the response to any incoming paging signals is generally made without the inter-frequency measurements.

Further, current RRM specifications dictate that a network may request that an already-connected mobile radio communications device perform inter-frequency measurements so as to lead to a frequency-handover in order to maintain minimal interference level as discussed above. However, it should be appreciated that such a method requires the use of "compressed mode" functionality which is generally available only as an optional capability within the mobile radio communications devices. This can advantageously cause interruption to the service availability and which can prove to be frustrating for the user.

DISCLOSURE OF THE INVENTION

Problems to be Solved by the Invention

The present invention seeks to provide for a method of initiating inter-frequency measurements within a mobile radio communications device, to a related mobile radio communications device network arrangement and mobile radio communications device per se, in which exhibit advantages over known such methods, arrangements and devices.

According to a first aspect of the present invention, there is provided a method of initiating inter-frequency measurements within a mobile radio communications device and including the step of inspecting via the network the load state of the cell in which the mobile radio communications device is located, paging the mobile radio communications device with a Paging Type 1 message indicating that the mobile radio communications device can perform inter-frequency measurement on the cells identified within System Information Block (SIB) signalling before responding to the paging signal.

The invention is particularly advantageous in that it is based on the realisation that for certain mobile terminated packet—switched services, it can prove possible to permit delays prior to the sending of the packet, or connection of the service, such delays being in the order of 2-3 seconds. SMS, MMS and pushed background services provide examples of such services that can offer undefined packet/service delay characteristics.

Advantageously, the present invention allows the network to effectively initiate inter-frequency measurements within the mobile radio communications device prior to its response to paging signalling. Then should a network overload situation arise, the network can readily push services out of the overloaded cell and into a different frequency layer without, for example, the currently experienced limitation and disadvantages such as service interruption as discussed above.

The inspection of the load within the cell is initiated by the arrival of a packet identified as exhibiting a delivery that can be delayed or when the mobile radio communications device is Radio Resources Control (RRC) connected.

The method can include the step of indicating by way of the Paging Type 1 message that the mobile radio communications device should perform inter-frequency measurements on cells signalled within the SIB 12 signalling before responding to the paging.

Preferably, for mobile radio communications devices that are in IDLE mode, the method can include the step of paging the network from the Core Network (CN) with an indicator message serving to initiate a search by the network of the said load state.

In this particular embodiment, the method includes the step of initiating the network to look at the load state of a pico cell, or micro cell, layer.

Yet further, the method can include the step of initiating inter-frequency measurements on the cell signalled within SIB 11 signalling before responding to the paging.

As will be appreciated from the above, if the RRM layer within the network determines a need for balancing of the cell signalling load across the various available frequencies then, in such a situation, the network can advantageously start requesting that the mobile radio communications devices perform the inter-frequency measurements.

Advantageously, such measurements can then be sent to the network in Random Access Channel (RACH) channel message paths.

Preferably, the method can use such measurements within the network, along with a network admission control algorithm in order to determine whether or not handover for the mobile radio communications device to the new cell offering a new frequency should be completed.

According to another aspect of the present invention there is provided a mobile radio communications device network arrangement for initiating inter-frequency measurements within a mobile radio communications device, and arranged in particular for determining the cell load state of a cell within which a mobile radio communications device is located, and further being arranged to page the mobile radio communications device with a Paging Type 1 message indicating that the mobile radio communications device should perform an inter-frequency measurement on cells identified within SIB signalling before responding to the paging.

The network arrangement can then initiate inter-frequency measurements within the mobile radio communications device prior to its response to paging signalling so that, advantageously, should a network overload situation arise, the network can readily push services out of the overloaded cell and into a different frequency layer.

As above, within the network arrangement of the invention, the inspection of the load within the cell is initiated by the arrival of a packet identified as exhibiting a delivery that can be delayed when the mobile radio communications device is Radio Resources Control connected.

The Paging Type 1 message can serve to indicate that the mobile radio communications device should perform inter-frequency measurements on cells signalled within the SIB 12 signalling before responding to the paging.

For mobile radio communications devices that are in the IDLE mode, the core network pages the network with an indicator message serving to initiate search by the network the load state.

As an alternative, the network arrangement serves to initiate inter-frequency measurements on the cell signalled within SIB 11 signalling before responding to the paging.

Yet further, the present invention can provide for a mobile radio communications device arranged to receive a Paging Type 1 message from a network arrangement such as that defined above, and to perform inter-frequency measurements on cells identified in SIB signalling and before responding to the paging.

Advantageously, the device is arranged to perform inter-frequency measurements on cells identified within SIB 12 signalling before responding to the paging.

As an alternative, the device is arranged to perform inter-frequency measurements on the cell identified within a SIB 11 signalling before responding to the paging.

While the above-mentioned comments relate in particular to inter-frequency measurements for mobile terminated calls, it should be appreciated that, according to another aspect of the present invention, inter-frequency measurements for mobile originated calls can also be provided for.

That is, according to another aspect of the present invention, there is provided a method of initiating inter-frequency measurements within a mobile radio communications device responsive to a determination of an "uplink interface" value, which is broadcast in SIB7 and its comparison with a threshold value.

Advantageously, the method includes the step of reading SIB 7 signalling upon performing an access attempt.

As will be appreciated with current specifications, the mobile radio communications device is arranged to read SIB 7 signal prior to commencing an access attempt on the RACH.

This particular aspect of the present invention is advantageously based on the realization that the uplink interface value provides an accurate indication of the load on the current frequency and so that it is advisable to provide an inter-frequency measurement report to the network if the interference value is above the threshold value. This advantageously assists the network in choosing the further frequency to which the mobile radio communications device might be pushed.

Yet further, the invention can provide for a mobile radio communications device arranged to initiate an inter-frequency measurement responsive to an uplink interference value exceeding a threshold value.

As above, the mobile radio communications device advantageously employs the uplink interface value from SIB 7 system information.

The aforementioned method and mobile radio communications device are particularly arranged for initiating inter-frequency measurements when in a CELL IDLE, CELL PCH, and URAPCH states.

As will therefore be appreciated, the present invention proposes the triggering of user such as mobile radio communications device to perform inter-frequency measurements when in IDLE, CELL PCH, or URAPCH states and advantageously during the time when the user equipment has received a Paging Type 1 message but prior to responsive to such paging messaging.

BEST MODE FOR CARRYING OUT THE INVENTION

Figure 1:
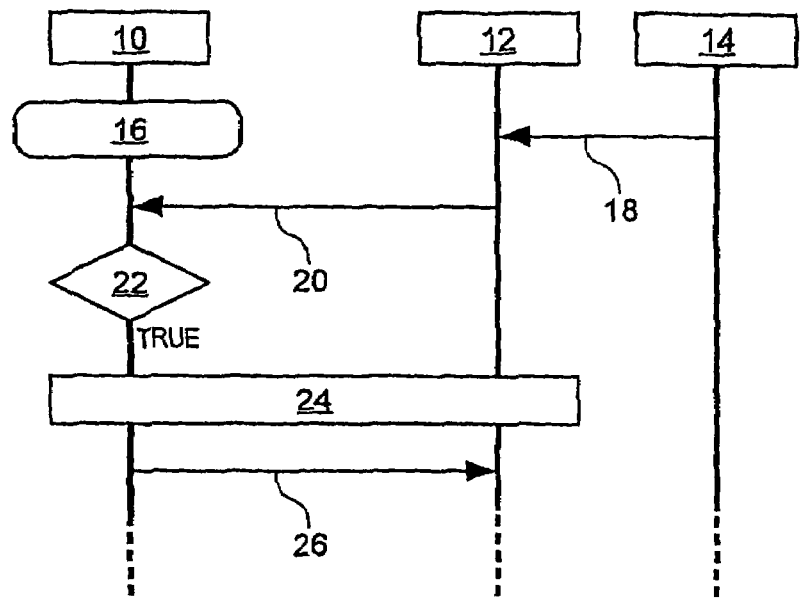
FIG. 1 is a timing diagram illustrating the initiation of the inter-frequency measurements while a mobile radio communications device is in an IDLE state.

The invention is described further hereinafter by way of example only, with reference to the accompanying drawings in which:

Turning first to FIG. 1, there is illustrated a signalling diagram concerning the signaling arising in accordance with an embodiment of the present invention when the mobile radio communications device is in an IDLE state.

There is shown signalling between the user equipment such as a cell phone handset 10, and related Universal Terrestrial Radio Access Network (UTRAN) 12 and Call Network (CN) 14.

As mentioned, and as confirmed at step 16, the handset 10 is in an IDLE state at the time the CN 14 delivers a RAP_Paging signal 18 to the UTRAN 12. The paging signal 18 is provided with a "delay allowed" field.

Subsequent to receipt of the paging signal 18, the UTRAN 12 issues a Paging Type 1 signal 20 to the handset 10 and which includes an inter-frequency measurement field set to TRUE.

Within the handset, at step 22, the inter-frequency measurement field is then checked and, upon determining that the inter-frequency measurement field is TRUE, the procedure continues to step 24 wherein inter-frequency measurements are conducted within the handset 10. Such inter-frequency measurements are then sent to the UTRAN 12 as part of a RACH channel message 26. Such messaging comprises the inter-frequency measurement information along with other parameters as required.

Thus, with the handset 10 in an IDLE mode, the UTRAN 12 can advantageously look at the load state at the pico/micro cell layer before determining whether or not to page the handset 10 with the Paging Type 1 signal 20. As noted above, the Paging Type 1 message serves to indicate whether or not the handset 10 should perform inter-frequency measurement on the cells signalled in SIB 11 before responding to the paging signal.

With regard to the above embodiment, the RANAP_Paging message can be based upon known paging messages but with the addition of a new Boolean field indicating "delay allowed."

Likewise, and as discussed above, the Paging Type 1 message can correspond to current paging messages accept but with the addition of a new Boolean field "inter-frequency measurement indicator."

Figure 2:
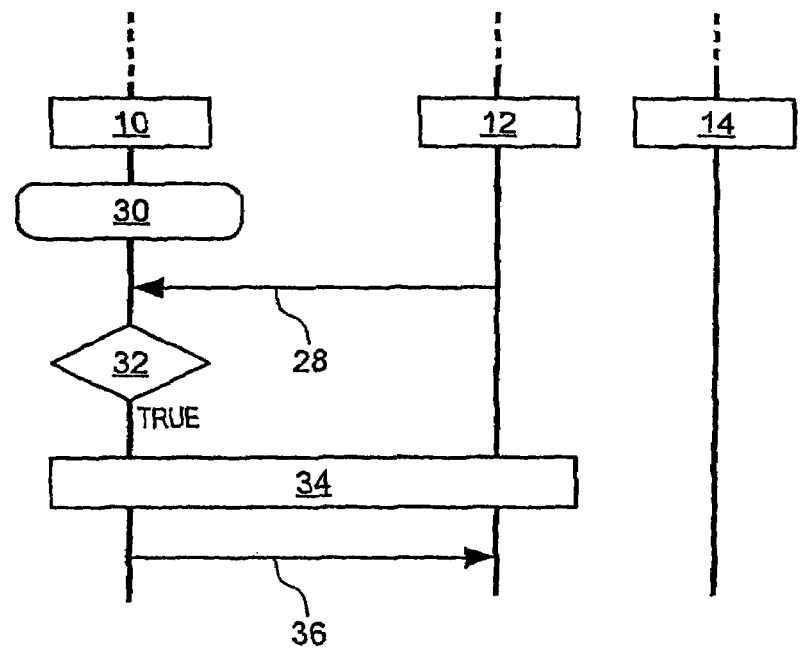
FIG. 2 is a similar timing diagram relating to a mobile radio communications device in a CELL PCH or URA PCH state.

Turning now to FIG. 2, there is illustrated an aspect of the present invention relating to a mobile radio communications device when in an RRC connected state, i.e. a CELL PCH/URA PCH state.

Again, the related cell phone handset 10, UTRAN 12 and CN 14 are indicated however in this instance there is no initiating paging message delivered from the CN 14 to the UTRAN 12.

Within FIG. 2 arrangement, the arrival of a packet whose delivery may be delayed is identified and this initiates the sending of a Paging Type 1 signal 28, again with its inter-frequency measurement field set to TRUE from the UTRAN 12 to the handset 10 which, as illustrated, is in a CELL PCH/URA PCH state 30.

As with the illustration provided by FIG. 1, upon receipt of the Paging Type 1 signal 28 at the handset 10, the inter-frequency measurement field is checked and if, at step 32, it is determined that the inter-field frequency is set to TRUE, the handset 10 is controlled so as to then perform inter-frequency measurements at step 34.

As above, the result of the inter-frequency measurements, along with other parameters appropriate, are delivered to the UTRAN 12 as part of the RRC connection request 36 by way of the RACH channel.

The cells upon which the inter-frequency measurements should be performed are identified within SIB 12 signalling.

Again, the Paging_Type 1 message can correspond to such current paging messages except for the addition of the further Boolean field "inter-frequency measurement indicator".

With regard to the aspect of the present invention relating to mobile-originated calls, its should be appreciated that, while no particular changes to current messaging are required, the user equipment is arranged to monitor the uplink-interference reading whilst also determining the particular type of service requested. This ensures that the service is not delay-sensitive, and serves to determine whether or not inter-frequency measurements should be performed.

It will of course be appreciated from the above that the present invention finds particular use with 3G-related devices and networks.

This application is based upon and claims the benefit of priority from United Kingdom Patent Application No. 0615033.8, filed on Jul. 28, 2006, the disclosure of which is incorporated herein in its entirety by reference.

The invention claimed is:

1. A method of initiating inter-frequency measurements within a mobile radio communications device within a pico/micro cell, said method comprising:

inspecting by way of a network the load state of the pico/micro cell in which the mobile radio communications device is located;

paging the mobile radio communications device with a Paging Type 1 message, which includes an inter-frequency measurement delay-allowed field, to indicate whether or not the inter-frequency measurements should be performed in the mobile radio communications device, before responding to the Paging Type 1 message;

conducting the inter-frequency measurements in the mobile radio communications device after checking the inter-frequency measurement delay-allowed field of the Paging Type 1 message, if the inter-frequency measurement delay-allowed field is indicative of an execution of the inter-frequency measurements, before responding to the Paging Type 1 message; and transmitting a result of the inter-frequency measurements on the pico/micro cells from the mobile radio communications device to the network through a Random Access Channel (RACH) channel.

2. The method as claimed in claim 1, wherein the inspection of the load within the pico/micro cell is initiated by the arrival of a packet identified as exhibiting a delivery that can be delayed.

3. The method as claimed in claim 1, further including indicating by way of the Paging Type 1 message whether or not the mobile radio communications device should perform inter-frequency measurements on cells signaled within SIB 12 signalling, which indicates to perform the inter-frequency measurements before responding to the paging.

4. The method as claimed in claim 1, further including paging the network from the core network with messaging serving to initiate the search by the network of the load state.

5. The method as claimed in claim 4, further including initiating inter-frequency measurements on a pico/micro cell identified within SIB 11 signalling which indicates to perform the inter-frequency measurements before responding to the paging.

6. The method as claimed in claim 1, wherein the said inter-frequency measurements are sent to the network in Random Access Channel message paths.

7. The method as claimed in claim 1, wherein the inter-frequency measurements along with a networks admission control algorithm serve to determine whether or not handover of the mobile radio communications device to the new frequency should be completed.

8. A mobile radio communications device network arrangement for initiating inter-frequency measurements within a mobile radio communications device within a pico/micro cell, and arranged for determining the cell load state of a pico/micro cell within which a mobile radio communications device is located, and for paging the mobile radio communications device with a Paging Type 1 message, which includes an inter-frequency measurement delay-allowed field, to indicate whether or not the mobile radio communications device should perform an inter-frequency measurements on pico/micro cells that are identified within SIB signaling, which indicates to perform the inter-frequency measurements before responding to the paging.

9. The network arrangement as claimed in claim 8, wherein the inspection of the load within the pico/micro cell is initiated by the arrival of a packet identified as exhibiting a delivery that can be delayed.

10. The network arrangement as claimed in claim 8, and indicating by way of the Paging Type I message whether or not the mobile radio communications device should perform inter-frequency measurements on cells identified within SIB 12 signalling, which indicates to perform the inter-frequency measurements before responding to the paging.

11. The network arrangement as claimed in claim 8, and arranged to receive the paging from the core network with an indicator message serving to initiate search by the network arrangement of the load state.

12. The network arrangement as claimed in claim 11, and initiating interfrequency measurements on a pico/micro cell identified within SIB 11 signalling, which indicates to perform the inter-frequency measurements before responding to the paging.

13. The network arrangement as claimed in claim 8, wherein the mobile radio communications device is arranged to receive, in an idle state, the Paging type 1 message indicating whether or not inter-frequency measurements should be performed before responding to the Paging Type 1 message.

14. A mobile radio communications device arranged to receive the Paging Type 1 message from the network arrangement as claimed in claim 8, wherein the mobile radio communications device is arranged to determine in response to the Paging Type 1 message whether or not inter-frequency measurements should be performed in the mobile radio communication device and to perform inter-frequency measurements on pico/micro cells identified in SIB signaling, which indicates to perform the inter-frequency measurements before responding to the paging.

15. A mobile radio communications device as claimed in claim 14, arranged to initiate an inter-frequency measurement responsive to an uplink interference value exceeding a threshold value.

16. The mobile radio communications device as claimed in claim 15, arranged to employ an uplink interface value from SIB 7 system information.

17. The method as claimed in claim 2, further including indicating by way of the Paging Type 1 message that the mobile radio communications device should perform inter-frequency measurements on cells signalled within SIB 12 signalling, which indicates to perform the inter-frequency measurements before responding to the paging.

* * * * *